W. E. HOLLAND.
STORAGE BATTERY GRID.
APPLICATION FILED NOV. 22, 1919.

1,380,963.

Patented June 7, 1921.
2 SHEETS—SHEET 1.

Inventor
Walter E. Holland.
by his Attorneys
Howson & Howson

W. E. HOLLAND.
STORAGE BATTERY GRID.
APPLICATION FILED NOV. 22, 1919.

1,380,963.

Patented June 7, 1921.
2 SHEETS—SHEET 2.

Inventor-
Walter E. Holland
by his Attorneys-
Howson & Howson

UNITED STATES PATENT OFFICE.

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

STORAGE-BATTERY GRID.

1,380,963.   Specification of Letters Patent.   Patented June 7, 1921.

Application filed November 22, 1919. Serial No. 339,854.

*To all whom it may concern:*

Be it known that I, WALTER E. HOLLAND, a citizen of the United States, residing in Philadelphia, Pennsylvania, have invented Storage-Battery Grids, of which the following is a specification.

One object of this invention is to provide a storage battery grid of the cored type, such as is described and claimed in the U. S. Patent #1,183,807, to E. E. Everett, dated May 16, 1916, which by reason of the construction of its bottom member, shall possess increased strength to support the weight of the plate and connected parts, and to resist the tendency of the supporting ribs or bridges of the jar to cut or break the bottom of the plate, when used in a class of service where the battery is subjected to vibration and shock.

Another object of the invention is to provide a battery plate, embodying a grid of the cored type, which by reason of its construction, shall overcome the tendency of the bottom of the plates as heretofore constructed to disintegrate or to short-circuit due to expansion or spreading of the two-piece bottom frame member as a result of oxidation of its contacting inner faces.

Another object of the invention is to provide a battery grid which while formed to receive and hold a large proportion of active material in the manner characteristic of a cored grid, shall eliminate the weak points heretofore inherent in this type of grid, in such a manner as to combine certain advantages of the uncored and cored types of grid.

A further object of the invention is to provide a battery plate having a grid of such design as to stiffen and strengthen it where most needed, as well as to overcome all tendency to buckle and to give better support to the active material, thus extending the life of the battery;—the plate at the same time having the advantage of high capacity as a result of the relatively large proportion of active material carried by the grid.

These objects and other advantageous ends I attain as hereinafter set forth, reference being had to the accompanying drawings, in which, Figure 1 is a side elevation of a battery grip constructed in accordance with my invention;

Figure 1:
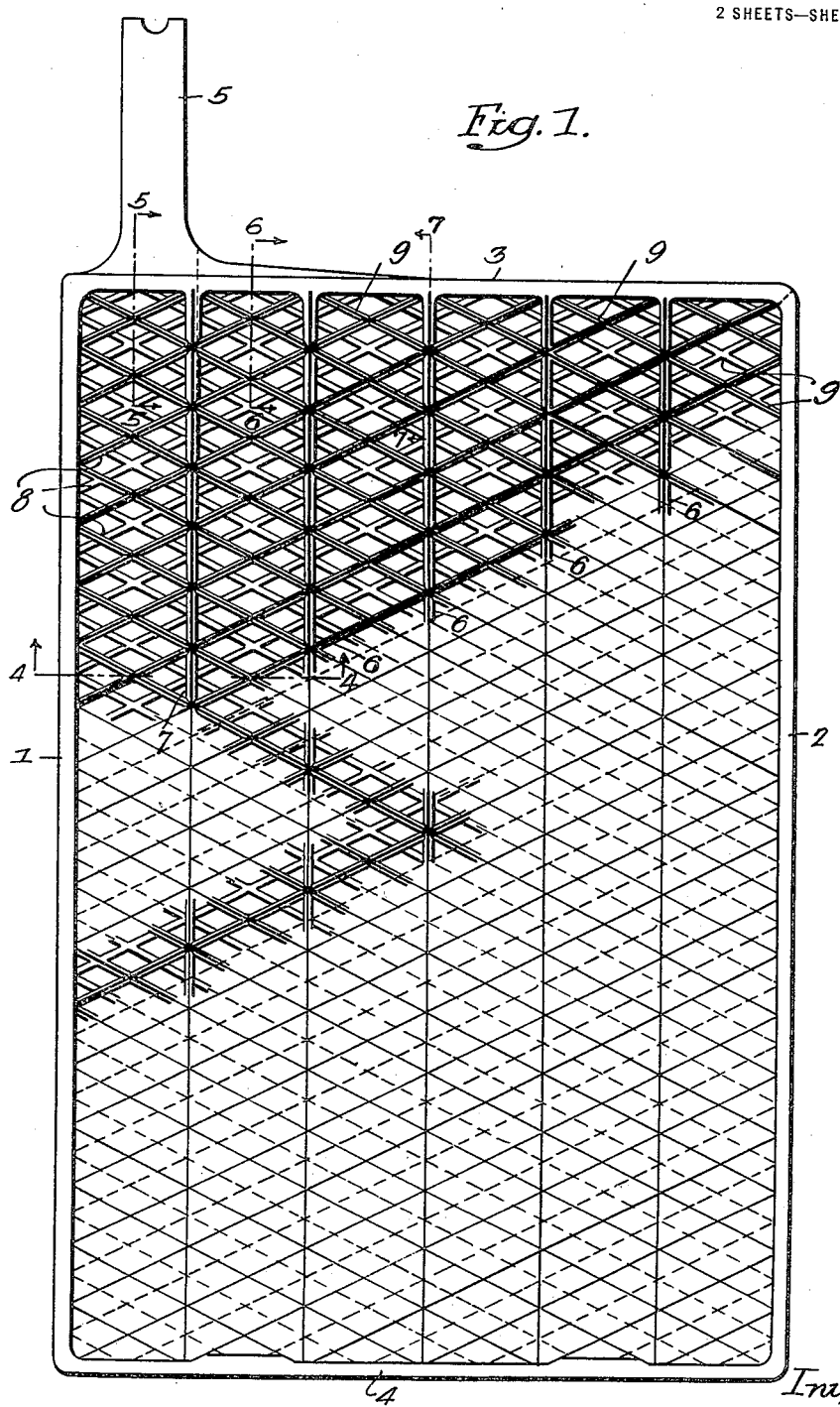
Figure 5:
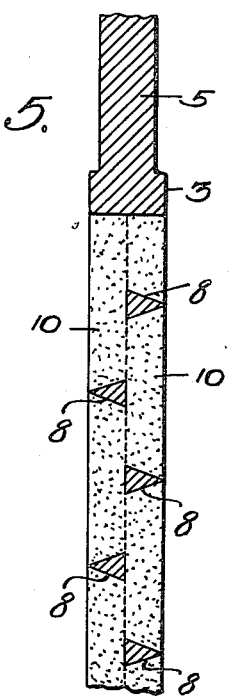
Figure 7:
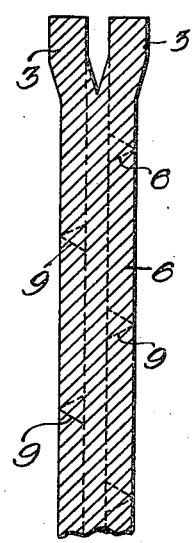
Figure 6:
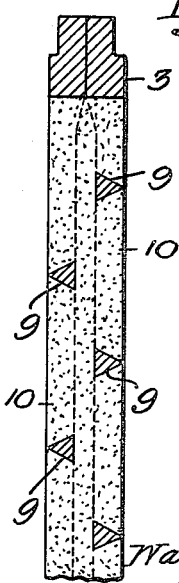

Figs. 5 and 6 are vertical sections on the lines 5—5 and 6—6, respectively, Fig. 1, also showing the active material as in the finished plate; and Fig. 7 is a vertical section on the line 7—7, Fig. 1 illustrating the top frame member in its open position.

In the above drawings 1 and 2 represent the side members and 3 and 4 the end members constituting the marginal frame of a storage battery grid which in the present instance, is of substantially rectangular outline and has adjacent one end of the top frame member 3 a flat projecting terminal lug 5.

Figure 4:
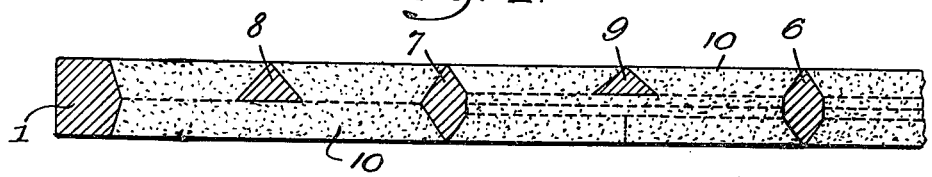
Fig. 4 is a transverse section on the line 4—4, Fig. 1 illustrating the detail construction of certain of the frame and rib members and showing the active material in the position occupied in a finished electrode or plate.

In accordance with my invention the frame members 1, 2 and 4 are of solid cross section as indicated for example, in Fig. 4, whereas the top frame member 3 from the upper end of the side member 2 to a point adjacent one side of the lower end of the terminal lug 5, is longitudinally and vertically split or made in two parts as indicated in Fig. 6. The top and bottom frame members 3 and 4 are connected, in the present instance, by five vertical ribs of which the four indicated at 6 are of substantially similar cross-section while the fifth indicated at 7 is of slightly different cross-section as shown in Fig. 4. All of these ribs preferably extend from the plane of one face of the grid to the plane of the opposite face.

The elongated panel defined by the rib 7, the side frame member 1, and the ends of the top and bottom members 3 and 4 has within it two series of auxiliary ribs 8—8 of which those of each series are of acute triangular section and of a height equal to one-half the thickness of the side frame member 1. As illustrated in Fig. 5, the sharp edges of these ribs are in or immediately adjacent the planes of the two grid faces, and the bases of both series of ribs lie within the central plane of the grid so that they are integral at the points at which they cross each other. Moreover each series of ribs includes two parallel sets intersecting each other at an angle and the intersections of the ribs of one series are opposite the centers of the diamond shaped openings defined by the ribs of the other series.

The panels defined by the top and bottom frame members 3—4, the ribs 6—6—7 and the side frame member 2, likewise have mounted in each of them two series of ribs 9—9 also of triangular cross section and arranged with their sharp edges respectively in the planes of the two grid faces. Moreover each series of these ribs 9—9 includes two sets of ribs respectively intersecting each other at an angle and the ribs of one series are so displaced relatively to those of the other series that the intersections of the ribs of said first series are at points opposite the centers of the diamond shaped openings defined by the ribs of the other series in the same panel. In this instance, however, the above noted five panels are cored, i. e., the two series of auxiliary ribs 9—9 are separated by a space extending the full length of each panel and of a width equal to the distance between the vertical ribs.

Figure 2:
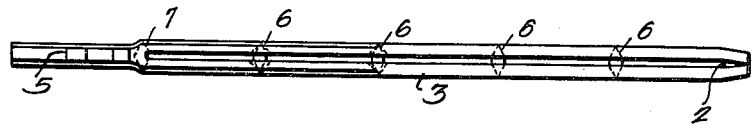
Fig. 2 is a plan of the grid shown in Fig. 1, illustrating its top frame member in the open position in which it is delivered from the casting machine.
Figure 3:
Fig. 3 is a plan similar to Fig. 2 but showing the top frame member as in its closed or finished condition.

In casting the grid, a metal mold having two similar main parts, or other suitable mold is employed, having formed in each part the intersecting recesses necessary to define one-half of the frame members, the lug 5 and the main and auxiliary ribs. In the case of the panel defined by the frame member 1 and rib 7, the two mold members are so shaped that their flat faces come together in the central plane of the grid, whereas in the case of the other five panels, elongated strips or blades constituting cores are introduced through the end of the mold so as to be in engagement with the mold faces. As a result when the cores are withdrawn and the cast grid is taken from the mold, the top of the grid has the appearance illustrated in Fig. 2 with its frame member 3 made in two parallel strips separated by a space equal to the thickness of the core members and connected at one end to the upper end of the side frame member 2 and at the other end to the metal at the base of the lug 5 and at the top of the rib 7.

As above noted, the two series of auxiliary ribs 9—9 of each of the five panels between the vertical rib 7 and the frame member 2 are separated by the narrow elongated space corresponding to the withdrawn core blades. Thereafter by any suitable means, as by pressing, the two parts of the frame member 3 are forced together, it being noted that where they join the top of the frame member 2, Fig. 2, as well as the vertical ribs (Fig. 7) they are preferably cast to define a wedge-shaped rather than a rectangular space, which permits them to be brought into contact up to their point of junction with said side member.

Obviously in accordance with my invention more than one of the panels may be made uncored, for example, when an unusually strong grid is required the outside panel immediately adjacent the frame member 2 would have its two series of auxiliary ribs in engagement, instead of in cored relation, similarly to the panel adjacent the frame member 1.

In the finished battery plate or electrode the active material 10 is filled into all the spaces between the ribs within the frame and is brought flush with the faces of the grid as defined by the planes of the opposite faces of the frame members 1, 2, 3, 4. This material is held from falling out by reason of the peculiar design and arrangement of the auxiliary ribs, and, by reason of the cored construction of the panels between the main rib 7 and the side frame member 2, is caused to constitute a relatively large proportion of the plate volume. As a consequence the plate possesses relatively high capacity and at the same time, by reason of the greater depth and integral interconnection of the ribs in the panel 1, 3, 7, 4, has a strong and stiff construction at that side in line with and adjacent the terminal lug 5, where there is present the greatest tendency to breakage of the auxiliary rib members.

Moreover instead of dividing the bottom frame member 4 as heretofore to permit of the introduction of the core blades, in accordance with my invention I divide that part of the top member 3 between the rib 7 and the frame member 2, leaving the bottom member 4 solid. As a consequence the latter has much greater mechanical strength to support the weight of the plate and its associated parts and is able to better resist the tendency of the supporting ribs or bridges to cut or break through the bottom frame member when used in a service, as for instance, in motor vehicles, where the battery is subjected to vibration and shock. Furthermore, as the grid surfaces become oxidized, as they unavoidably will in battery service, the split frame member, whether it be at the top or bottom, tends to open and in many cases does eventually open as a result of the expansive action of the lead peroxid formed on the contacting inner faces of its two parts which have been closed together. By having the split frame member at the top, the active material can not drop out even though the two parts of that member separate or open; in fact, the split frame member when at the top may be so constructed as to be left open, thus eliminating the closing operation; also, due to the fact that the insulating separators as usually constructed extend some distance above the plate tops and very little if any below the plate bottoms, there is much less chance of a short-circuit being formed between adjacent plate edges by the expansion of the split member or the "treeing" of active material loosened thereby. Furthermore, by having the split or two-piece member at the top, the points of union with the one-piece members are greatly strengthened,—at the lug end by the increased width of the members and at the opposite end by the tapered construction employed in the casting mold at the juncture of the member 2 with the two-piece member 3.

I claim:

1. A battery grid consisting of a substantially rectangular marginal frame having side, top and bottom members; a terminal lug projecting from the top frame member; substantially parallel ribs connecting the top and bottom members and defining panels; and two series of auxiliary ribs in each of the panels, arranged in parallel planes with a chamber between them, the top frame member being longitudinally split in the form of two substantially parallel parts connected at their ends, and the bottom frame member being solid.

2. A battery grid consisting of a substantially rectangular marginal frame; a terminal lug projecting from one end of the top member of said frame; a series of parallel ribs connecting the top and bottom members and, with the side members, defining panels, the top frame member being solid at the upper end of a panel adjacent the base of the terminal lug and being formed in two parallel portions where it defines the upper ends of others of the panels.

3. A battery grid consisting of a marginal frame; substantially parallel main ribs extending between the top and bottom members of the frame and coöperating therewith to define a series of panels; and auxiliary ribs in the panels, the ribs in at least one panel being disposed in two sets respectively engaging each other and those in the others of said panels being likewise disposed in two sets but spaced apart to form a chamber.

4. A battery grid consisting of a marginal frame; a series of parallel main ribs connecting the top and bottom members of the frame and coöperating therewith to define a number of panels; with two series of auxiliary ribs in each of the panels, the two series of ribs in at least one of the panels extending into a common plane and intersecting each other between the sides of said panel, and the ribs of the two series of one or more of the other panels being spaced apart to form elongated open spaces for the reception of active material.

5. A battery grid consisting of a marginal frame; main parallel ribs connected to opposite sides of said frame, and coöperating therewith to define panels; two series of auxiliary ribs of substantially triangular section in each of the panels of which the ribs of each series of at least one panel, have their base portions in the same plane and include integral intersecting parts, while the two series of auxiliary ribs of the remaining panels are spaced apart to provide elongated chambers for the reception of active material.

6. A battery grid consisting of a marginal frame; a terminal lug projecting from said frame; parallel main ribs connecting two opposite frame members and coacting therewith to define panels; with two series of auxiliary ribs in each of the panels, the auxiliary ribs of the outer panel adjacent the terminal lug being formed to join each other between the sides of said panel and the two series of auxiliary ribs of each of the other panels being spaced apart to form chambers for the reception of active material.

7. A battery grid cored from the top and having vertical panels of which at least one is not cored.

8. A battery plate consisting of active material and a cored supporting grid made with top-entering cores and having vertical panels of which at least one panel is uncored.

9. A battery plate consisting of active material and a supporting grid of which the top frame member is divided.

In witness whereof I affix my signature.

WALTER E. HOLLAND.